(No Model.)

H. A. DALRYMPLE.
Spring Bed Bottom.

No. 241,792. Patented May 24, 1881.

WITNESSES
Jas. W. Reed Jr.
George V. Mallon

INVENTOR
Hartwell A. Dalrymple
By his Att'y.
Henry W. Williams

UNITED STATES PATENT OFFICE.

HARTWELL A. DALRYMPLE, OF GARDNER, MASSACHUSETTS.

SPRING BED-BOTTOM.

SPECIFICATION forming part of Letters Patent No. 241,792, dated May 24, 1881.

Application filed April 21, 1881. (No model.)

*To all whom it may concern:*

Be it known that I, HARTWELL A. DALRYMPLE, of Gardner, in the county of Worcester and State of Massachusetts, have invented new and useful Improvements in Spring Bed-Bottoms, of which the following is a specification.

Figure 1:
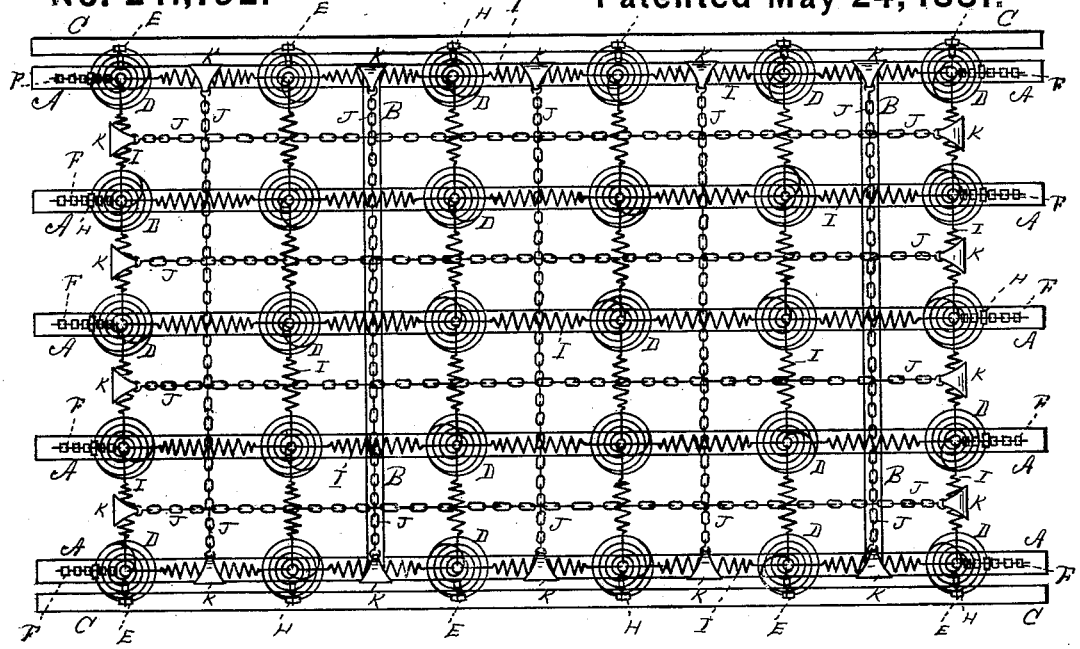
Figure 2:
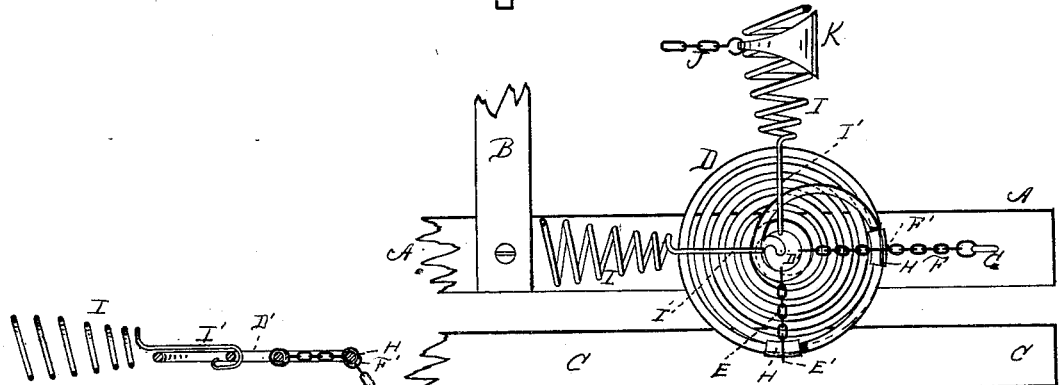
Figure 3:
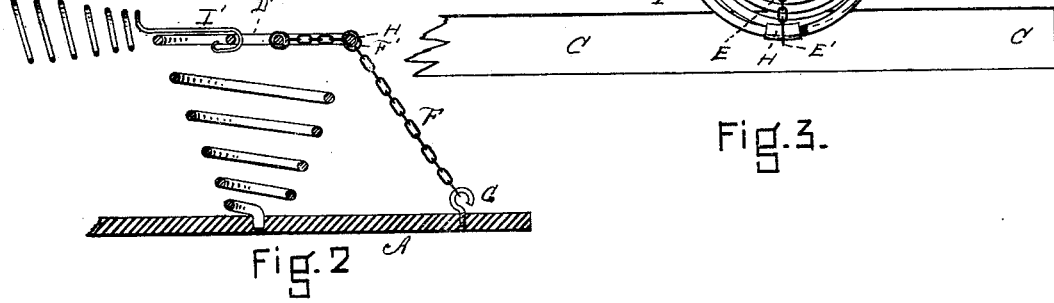

In the accompanying drawings, in which similar letters of reference indicate corresponding parts, Figure 1 is a plan view of my improved bed-bottom. Fig. 2 is a vertical section of one of the corner helical springs. Fig. 3 is an enlarged plan view of a corner spring and its connections.

A A are the main slats, to which are secured the helical springs D, in any desired number.

B B are cross-slats extending from one outer main slat, A, to the other.

C C are supplemental slats suspended from the springs upon the outer main slats by means of short chains, E. Longer chains, F, connect the end springs with the slats by means of hooks or other devices G, (see Figs. 2 and 3,) driven into said slats. Both sets of chains, E and F, in passing from the slats over the outer coils of the springs A, have tubes H thrust through one of their links E′ F′, such tubes being placed around the outer coils for the purpose of protecting them from injury, and said links being enlarged, if desired, for the purpose of embracing the tubes. The chains, having passed over or around the outer coils, catch in the innermost coils D′ of the springs, as will be seen in Figs. 2 and 3.

I I are spiral horizontal springs connecting the upright helical springs D longitudinally and transversely, catching into their inner coils D′ by means of their hooked ends I′.

J J are horizontal, longitudinal, and transverse chains, each of which extends from an outer horizontal spiral spring, I, midway between the two next helical springs, alternately over and under the intersecting chains, to the opposite outer horizontal spring, as shown in the drawings. These chains J may catch in and be secured to the springs I directly; but they are preferably secured to a guard-ring or ferrule, K, at each end, said ring being placed upon the spring I to protect it from injury, and being of the general shape shown—*i. e.*, broad on the outer side, so as to more thoroughly prevent the spring I from being bent out of shape, and narrow on the inner side, so as to allow the chain to hook onto it. These chains J may be of any style, or there may be substituted bands of suitable material, such as leather or textile fabric. In fact, any connections which are flexible but non-elastic may be used, all such being mechanical equivalents of the chains J. The usual width of such bands would be, say, one or two inches of the chains— perhaps from one-half inch to two inches.

The chains J are easily unhooked, and the horizontal spirals I easily uncaught, and the ferrules K slipped off for packing purposes.

The supplemental slats C can be secured to the side rails of a bedstead in any convenient manner, if desired.

The principle of this bed-bottom may be applied to lounges, sofas, or upholstered furniture of any description.

Having thus fully described my invention, what I claim, and desire to secure by Letters Patent, is—

1. In combination with the helical springs D, secured to the slats, and the horizontal, longitudinal, and transverse springs I, the intermediate longitudinal and transverse chains or bands J, having their ends secured to the outer horizontal springs, I, between the vertical springs D, substantially as set forth.

2. In combination with the chains J and springs I, the ferrule or shield K, substantially as and for the purpose described.

HARTWELL A. DALRYMPLE.

Witnesses:
WILLIAM M. GRAY,
CHAS. K. SYMMES.